US007147335B1

(12) United States Patent
Dickinson

(10) Patent No.: US 7,147,335 B1
(45) Date of Patent: Dec. 12, 2006

(54) LATERAL REAR VIEWING MIRROR FOR MOTOR VEHICLES

(76) Inventor: Roger Dickinson, 3279 Sheringham Rd., Orlando, FL (US) 32808

( * ) Notice: Subject to any disclaimer, the term of this patent is extended or adjusted under 35 U.S.C. 154(b) by 20 days.

(21) Appl. No.: 11/048,128

(22) Filed: Feb. 1, 2005

(51) Int. Cl.
*B60R 1/08* (2006.01)

(52) U.S. Cl. ...................... 359/841; 359/857
(58) Field of Classification Search ............... 359/841, 359/844, 857; B60R 1/08, 1/078
See application file for complete search history.

(56) References Cited

U.S. PATENT DOCUMENTS

| 4,911,545 | A | * | 3/1990 | Miller ..................... 359/841 |
| 5,056,904 | A | * | 10/1991 | Okamura .................. 359/841 |
| 6,109,755 | A | * | 8/2000 | Duroux et al. ............. 359/841 |
| 6,715,893 | B1 | * | 4/2004 | Martinson ................. 359/855 |
| 2002/0186481 | A1 | * | 12/2002 | Martinson ................. 359/855 |

FOREIGN PATENT DOCUMENTS

| DE | 10055259 | * | 7/2001 |
| JP | 2003252115 | * | 9/2003 |
| WO | WO 9324345 | * | 12/1993 |

* cited by examiner

*Primary Examiner*—Mark A. Robinson
(74) *Attorney, Agent, or Firm*—Michael I Kroll

(57) ABSTRACT

An apparatus 10 provides an angled mirror 24 on a rear portion of the motor vehicle 12 that will be viewable in the side view mirror 12 to permit the driver 18 to see perpendicularly approaching traffic while backing out. The apparatus 10 is to be mounted on both sides of the vehicle 12 and may be manufactured in new vehicles or retrofit to existing ones. When manufactured in new vehicles 12, the apparatus 10 may be selectively adjusted by the driver using controls and technology similar to that currently in use for adjusting side view mirrors such as cables or RF signals. Furthermore, the mirror may be retractable to sit flush with the body of the vehicle 12 to maintain the aerodynamic properties thereof. Many other features may be integrated with the apparatus 10 such as a heating element for defrosting/defogging the mirror, a protective door that covers the mirror when in the retracted position and so forth. The apparatus 10 may be temporarily or permanently affixed when retrofit to existing vehicles 12 using any suitable attachment means such as bolts or screws, adhesive, magnetic fasteners 32 and the like.

2 Claims, 15 Drawing Sheets

LATERAL REAR VIEWING MIRROR FOR MOTOR VEHICLES

BACKGROUND OF THE INVENTION

1. Field of the Invention

The present invention relates generally to mirrors for automobiles and, more specifically, to an angled mirror that is side-mounted on the rear of motor vehicle and works in conjunction with the side view mirror to laterally extend the drivers field of vision when obstructed by an adjacent vehicle.

Motorists tend to rely on rear and side view mirrors while backing out of a spot when their field of vision is obstructed on one or more sides. The limited field of vision provided by the rear and side view mirrors is fine for viewing what is behind and immediately beside the vehicle but is woefully inadequate for recognizing a tangentially approaching vehicle which is the primary cause of accidents in parking lots. The present invention seeks to overcome the shortcomings of the prior art by providing an angled mirror on a rear portion of the motor vehicle that will be viewable in the side view mirror to permit the driver to see perpendicularly approaching traffic while backing out. The present invention is to be mounted on both sides of the vehicle and may be manufactured in new vehicles or retrofit to existing ones.

When manufactured in new vehicles, the present invention may be selectively adjusted by the driver using controls and technology similar to that currently in use for adjusting side view mirrors such as cables or RF signals. Furthermore, the mirror of the present invention may be retractable to sit flush with the body of the vehicle to maintain the aerodynamic properties thereof. Many other features may be integrated with the present invention such as a heating element for defrosting/defogging the mirror, a protective door that covers the mirror when in the retracted position and so forth.

The present invention may be temporarily or permanently affixed when retrofit to existing vehicles using any suitable attachment means such as bolts or screws, adhesive, magnetic fasteners and the like.

The present invention seeks to reduce the risks and hazards involved in backing up a motor vehicle by reducing blind spots created by adjacent obstructions.

2. Description of the Prior Art

There are numerous mirror-viewing devices for motor vehicles known in the art. While these mirror-viewing devices may be suitable for the purposes for which they were designed, they would not be as suitable for the purposes of the present invention as hereinafter described.

SUMMARY OF THE PRESENT INVENTION

The present invention provides an angled mirror on a rear portion of the motor vehicle that will be viewable in the side view mirror to permit the driver to see perpendicularly approaching traffic while backing out. The present invention is to be mounted on both sides of the vehicle and may be manufactured in new vehicles or retrofit to existing ones. When manufactured in new vehicles, the present invention may be selectively adjusted by the driver using controls and technology similar to that currently in use for adjusting side view mirrors such as cables or RF signals. Furthermore, the mirror of the present invention may be retractable to sit flush with the body of the vehicle to maintain the aerodynamic properties thereof. Many other features may be integrated with the present invention such as a heating element for defrosting/defogging the mirror, a protective door that covers the mirror when in the retracted position and so forth.

The present invention may be temporarily or permanently affixed when retrofit to existing vehicles using any suitable attachment means such as bolts or screws, adhesive, magnetic fasteners and the like.

A primary object of the present invention is to provide a lateral, rear viewing mirror for motor vehicles that will allow a driver to view traffic that is approaching the rear of the vehicle in a perpendicular manner.

Another object of the present invention is to provide a lateral, rear viewing mirror for motor vehicles that may be factory installed during manufacture or retrofit to existing vehicles.

Still another object of the present invention is to provide a lateral, rear-viewing mirror for motor vehicles that may be permanent or portable.

Another object of the present invention is to provide a lateral, rear-viewing mirror for motor vehicles that will reduce the hazards of backing up in a parking lot, into a street or in any other situation where the peripheral vision of the driver is otherwise obstructed.

Still another object of the present invention is to provide a lateral, rear viewing mirror for motor vehicles that is simple and easy to use.

Still yet another object of the present invention is to provide a lateral, rear viewing mirror for motor vehicles that is inexpensive to manufacture and use.

Additional objects of the present invention will appear as the description proceeds.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
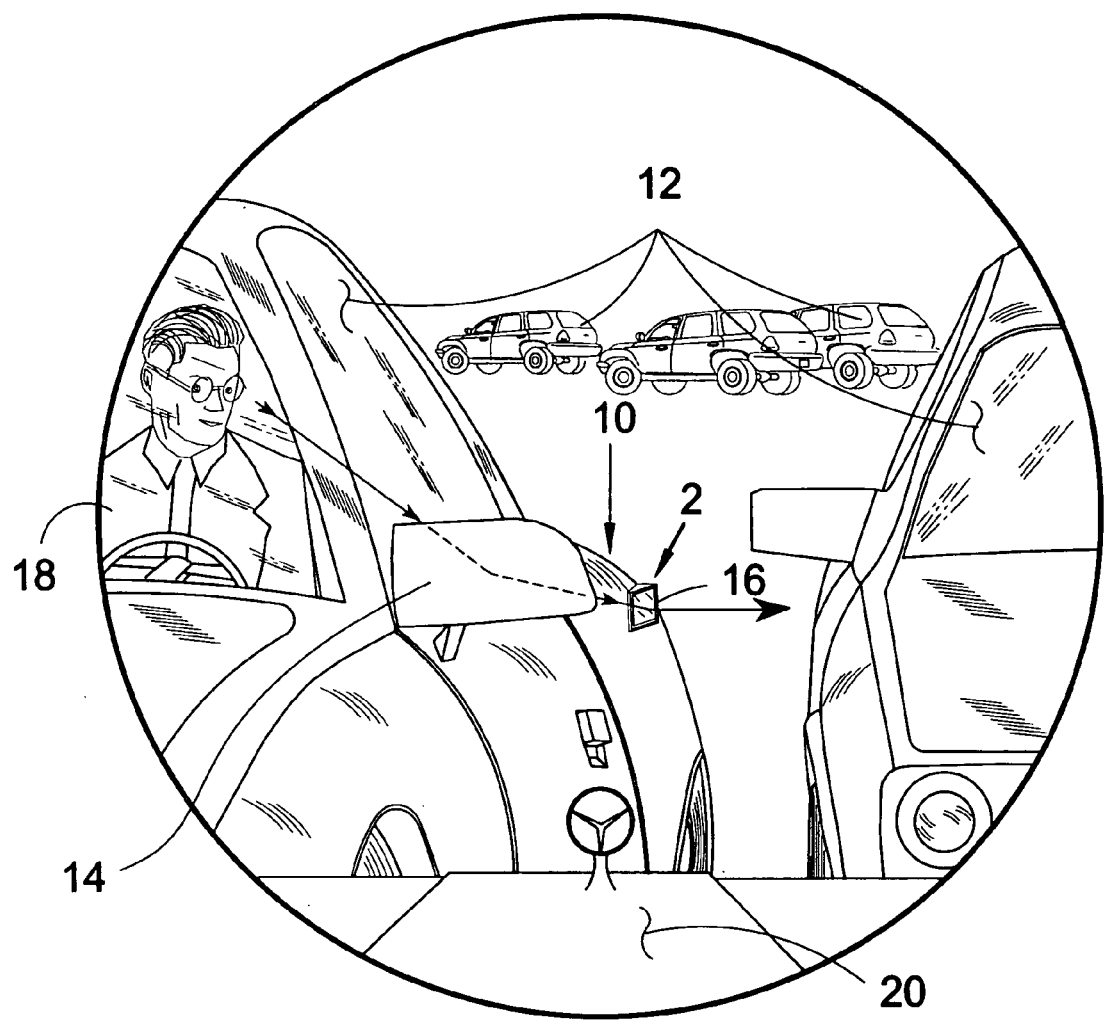
FIG. 1 is an illustrative view of the present invention in use.

With regard to reference numerals used, the following numbering is used throughout the drawings.
- 10 present invention
- 12 vehicle
- 14 side mirror
- 16 rear mirror
- 18 user
- 20 front of parked vehicle
- 22 housing
- 24 angled mirror
- 26 viewing area
- 28 conventional side mirror
- 30 increased viewing area
- 32 magnetic strip
- 34 quarter panel
- 36 pivot point
- 38 parking lot

DETAILED DESCRIPTION OF THE PREFERRED EMBODIMENT

The following discussion describes in detail one embodiment of the invention. This discussion should not be construed, however, as limiting the invention to those particular embodiments since practitioners skilled in the art will recognize numerous other embodiments as well. For a definition of the complete scope of the invention, the reader is directed to the appended claims.

Turning to FIG. 1, shown therein is an illustrative view of the present invention 10 in use. The present invention 10 is an adjustable mirror 16 mountable on an automobile 12 such that when used in conjunction with the conventional side mirror(s) 14 the user's lateral viewing range is increased. Depicted above is an adjustable mirror 16 of the present invention 10 mounted on the rear quarter panel of an automobile 12. The placement of the adjustable mirror 16 allows the user 18 to view cross traffic and aids the user in backing out of a parking space. Also shown is the front 20 of a parked vehicle.

Figure 2:
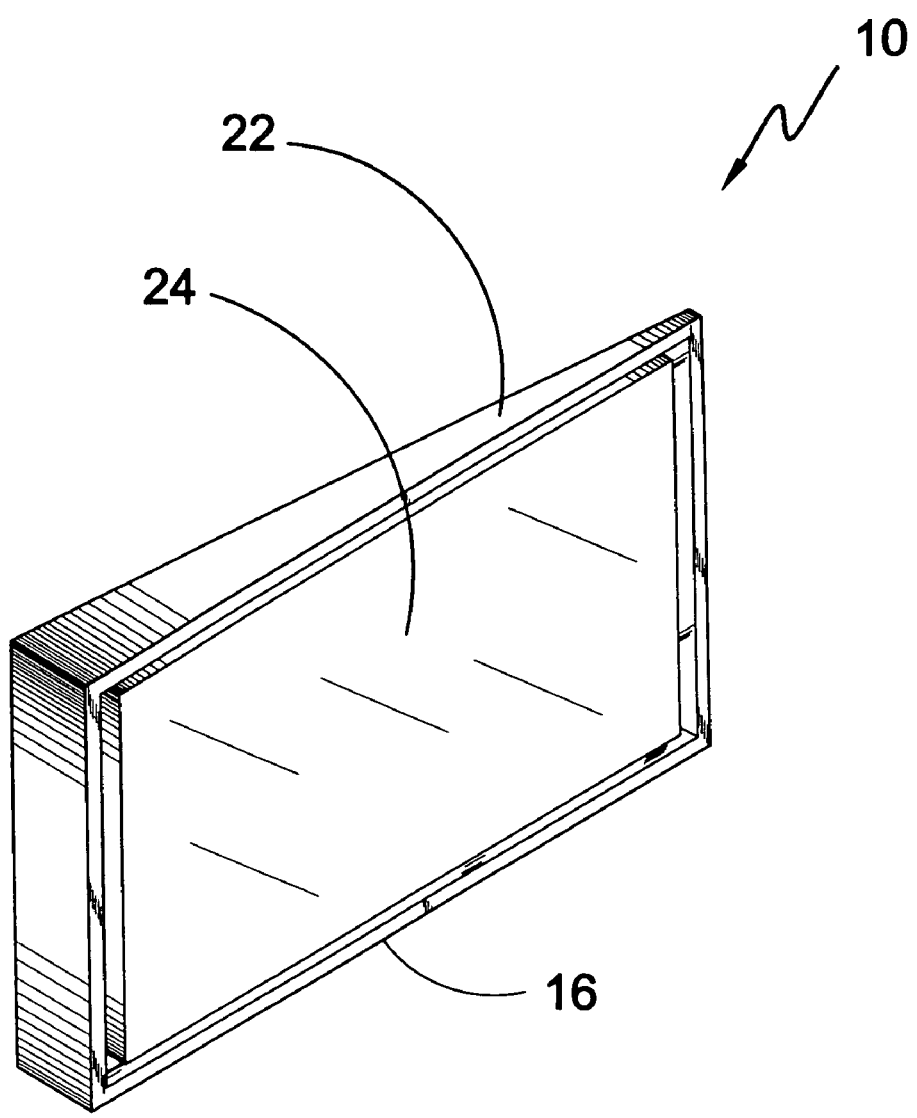
FIG. 2 is a perspective view of the present invention.

Turning to FIG. 2, shown therein is a perspective view of the present invention 10. Shown is the present invention 10 disclosing an adjustable mirror 16 mounted in a rigid tapered box like housing 22 to provide an angled mirror 24. The adjustable mirror 16 may be permanently affixed to the automobile, or temporarily secured allowing the adjustable mirror to be removed and reattached as desired.

Figure 3:
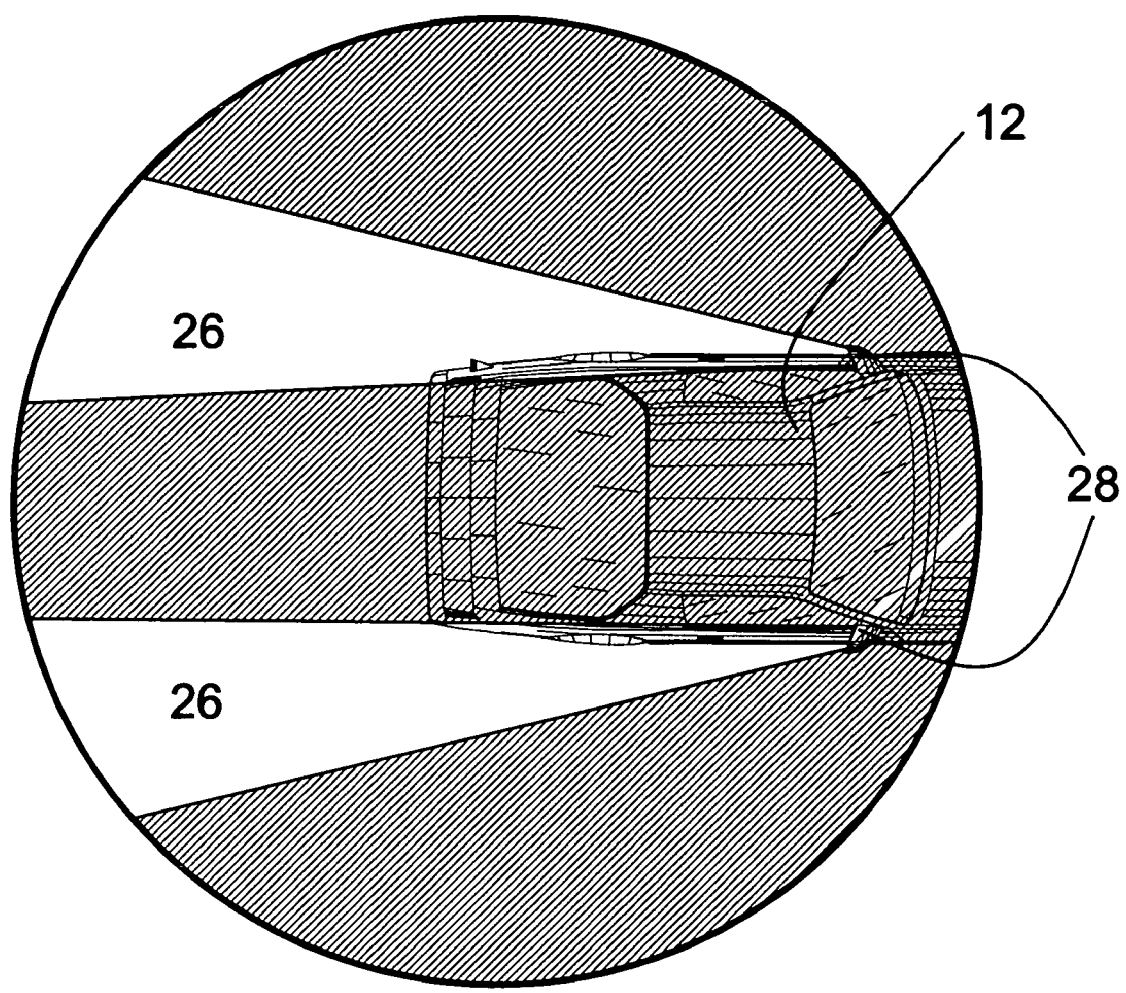
FIG. 3 is a top view of the prior art in use.

Turning to FIG. 3, shown therein is a top view of the prior art. Depicted above is the viewing area 26 that is provided with the use of standard side mirrors 28 on vehicle 12. The viewing area 26 from the side mirror limits the user's ability to see oncoming cross traffic.

Figure 4:
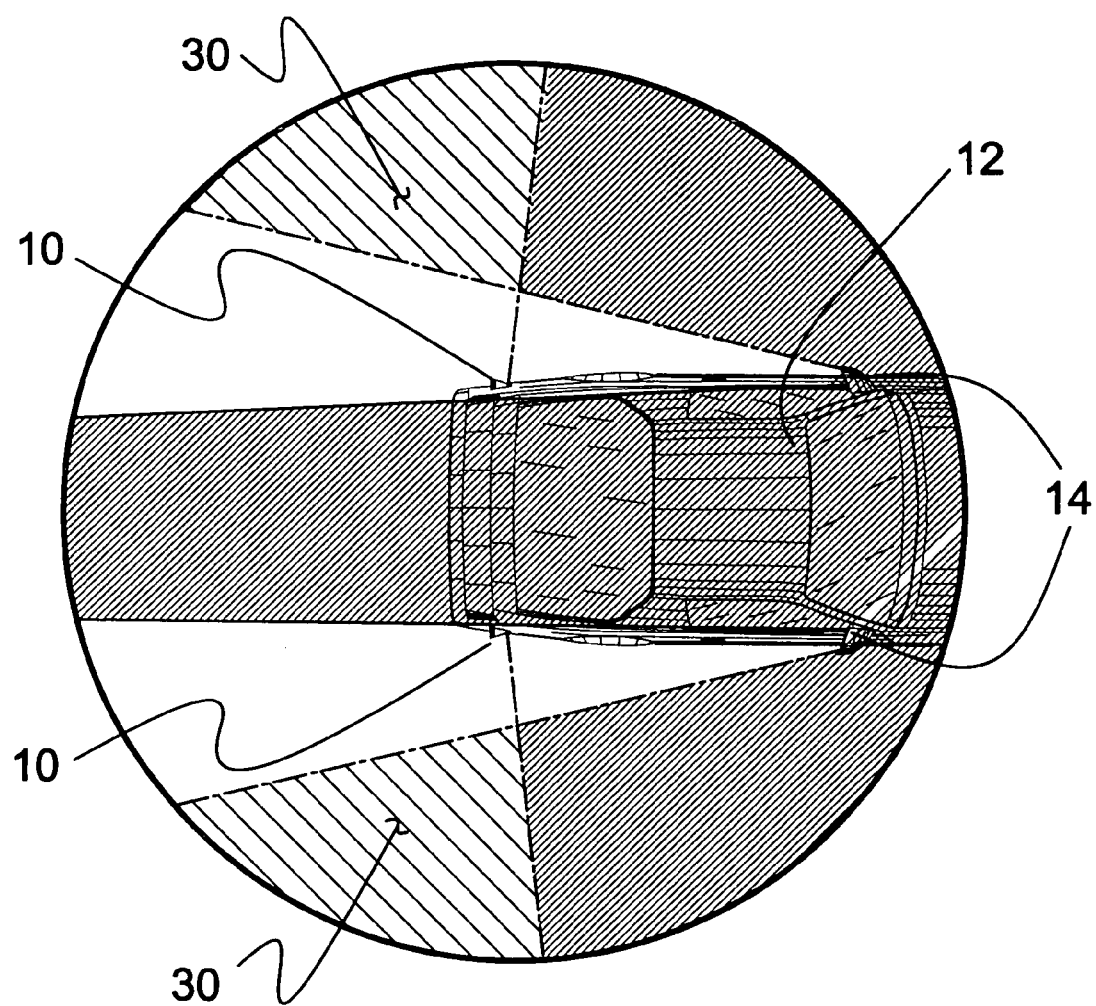
FIG. 4 is a top view of the present invention in use.

Turning to FIG. 4, shown therein is a top view of the present invention 10 in use. Depicted is the increased viewing area 30 that is provided with the use of adjustable mirrors of the present invention 10. The increased angle and improved viewing area of the adjustable mirror of the present invention 10 is obtained through the projected image provided by the standard side mirror 14 of vehicle 12.

Figure 5:
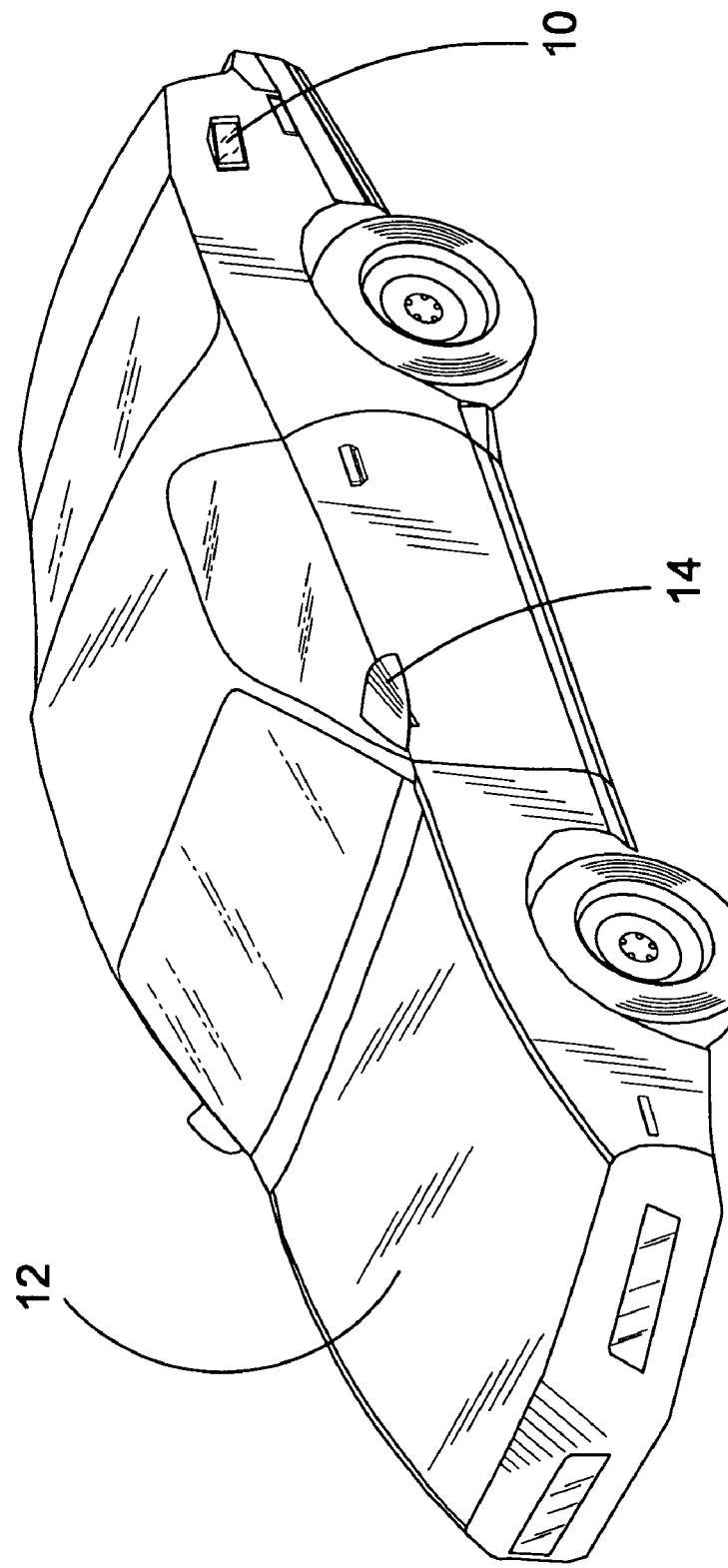
FIG. 5 is a perspective view of the present invention mounted on a motor vehicle.

Turning to FIG. 5, shown therein is a perspective view of the present invention 10 mounted on a motor vehicle 12. Shown is the present invention 10 fixedly attached to the rear panel of a motor vehicle 12. The mirror of the present invention 10 is used in conjunction with the side view mirrors 14 of the motor vehicle 12 to provide the user increased lines of sight that are perpendicular to the user's direction of travel.

Figure 6:
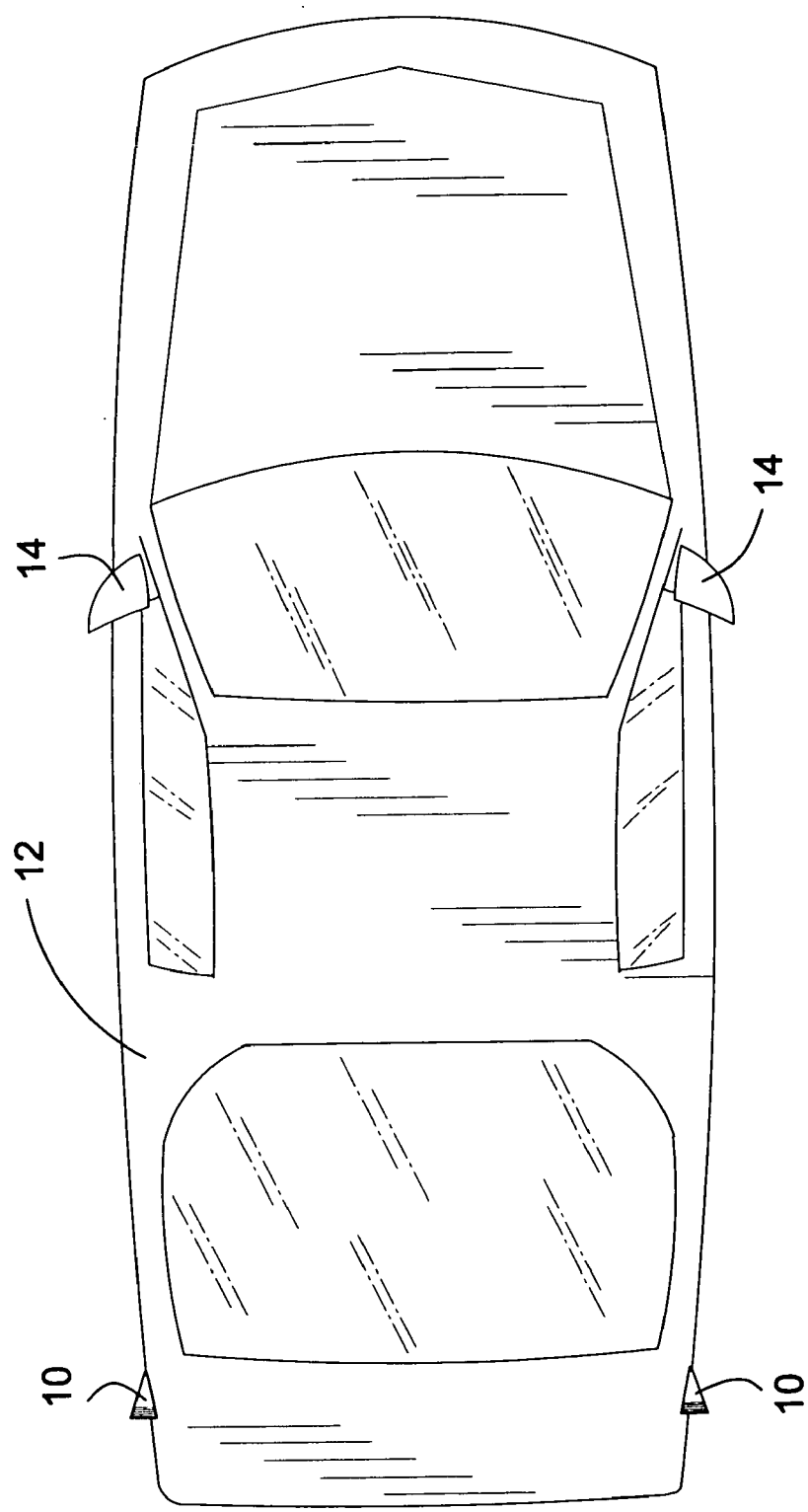
FIG. 6 is a top view of the present invention mounted on a motor vehicle.

Turning to FIG. 6, shown therein is a top view of the present invention 10 mounted on a motor vehicle. Shown is the present invention 10 mounted on both driver and passenger sides of the rear of the motor vehicle 12. The adjustable mirrors of the present invention 10 allow the user of the vehicle to view images laterally what is viewed through standard front side mirrors 14.

Figure 7:
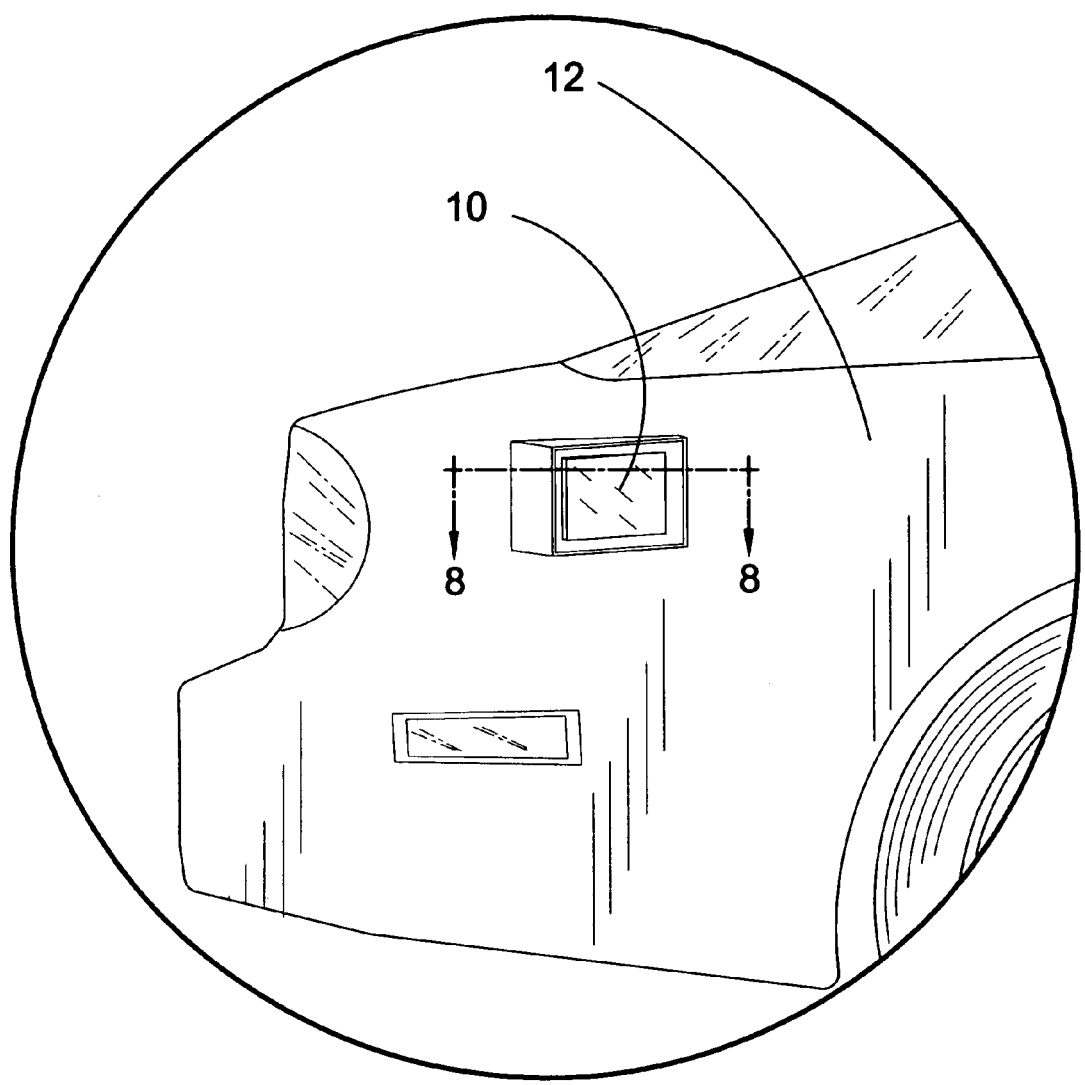
FIG. 7 is a side view of the present invention in use.

Turning to FIG. 7, shown therein is a side view of the present invention 10 in use. In a preferred element of the present invention 10, the adjustable mirror is secured to the automobile 12 by temporary means. Depicted above is an adjustable mirror of the present invention 10 secured to the rear panel of the automobile 12 by magnetics. The adjustable mirror of the present invention 10 is removable for portability and convenience.

Figure 8:
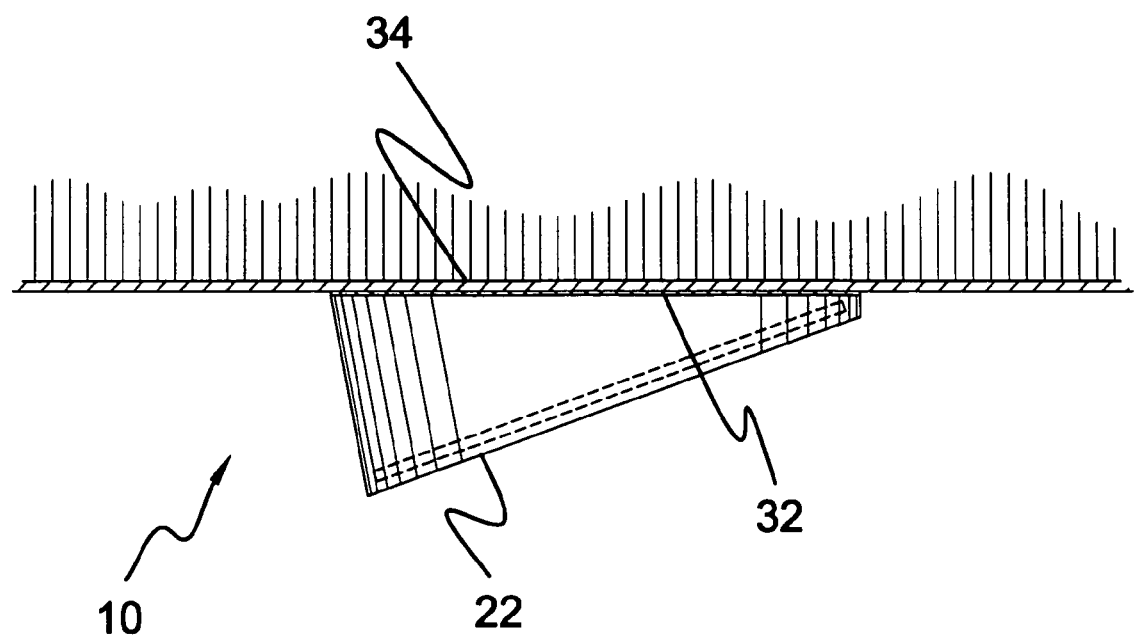
FIG. 8 is a cross sectional view of the present invention in use.

Turning to FIG. 8, shown therein is a cross sectional view of the present invention 10. Depicted above is a sectional view taken from FIG. 7 as indicated. The adjustable mirror is temporarily secured to the automobile by magnetics. A magnetic strip 32 affixed to the outer wall of the housing 22 provides means to attach the adjustable mirror to the automobile quarter panel 34.

Figure 9:
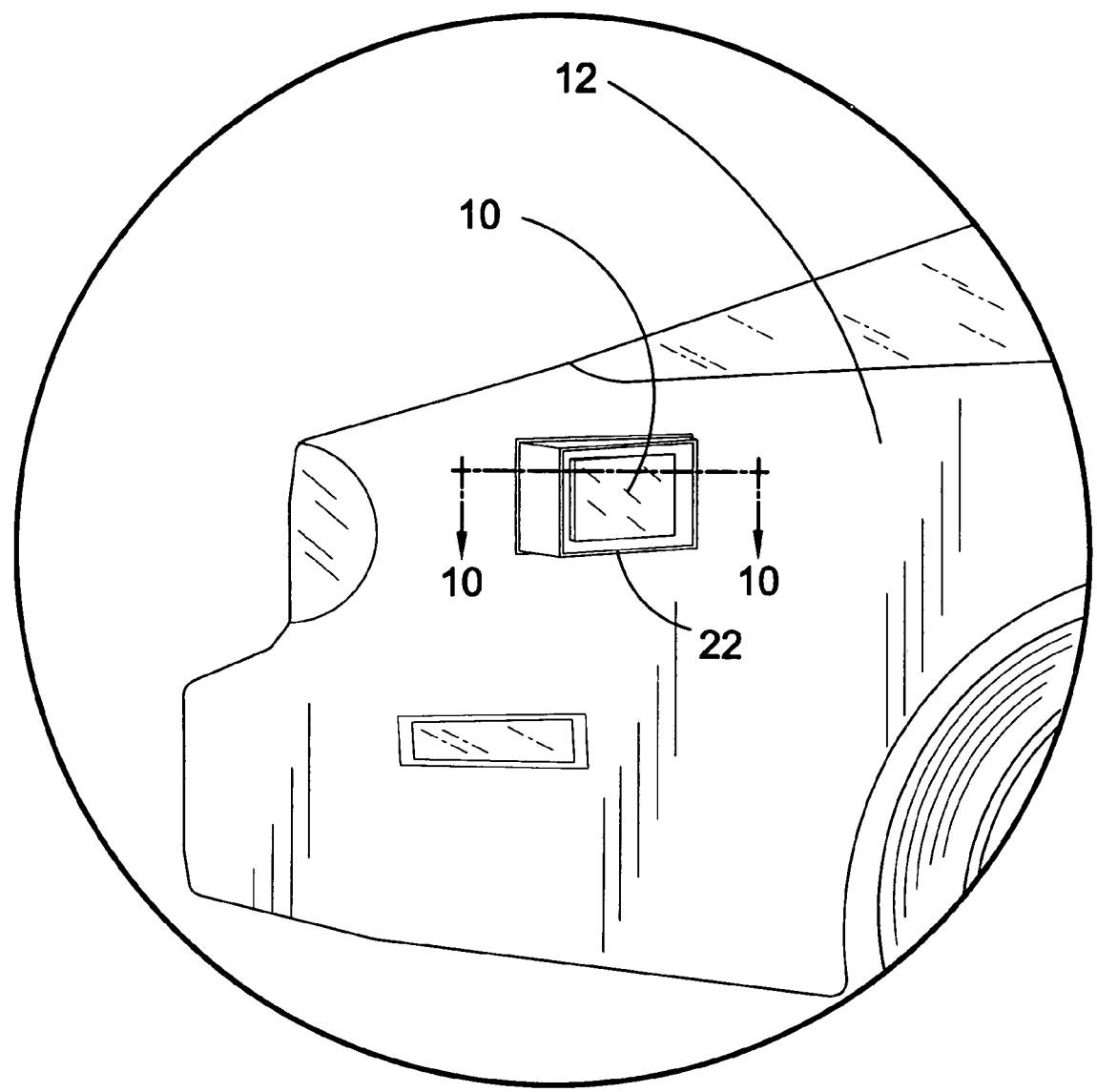
FIG. 9 is a side view of the present invention in use.

Turning to FIG. 9, shown therein is a side view of the present invention 10 in use in another preferred element of the present invention wherein the adjustable mirror is fixedly attached to the automobile 12 by permanent means. Depicted above is an adjustable mirror of the present invention 10 in an open position affixed to the rear panel of the automobile 12. The shape and contour of the adjustable mirror housing 22 may vary to suit different make and model automobiles 12.

Figure 10:
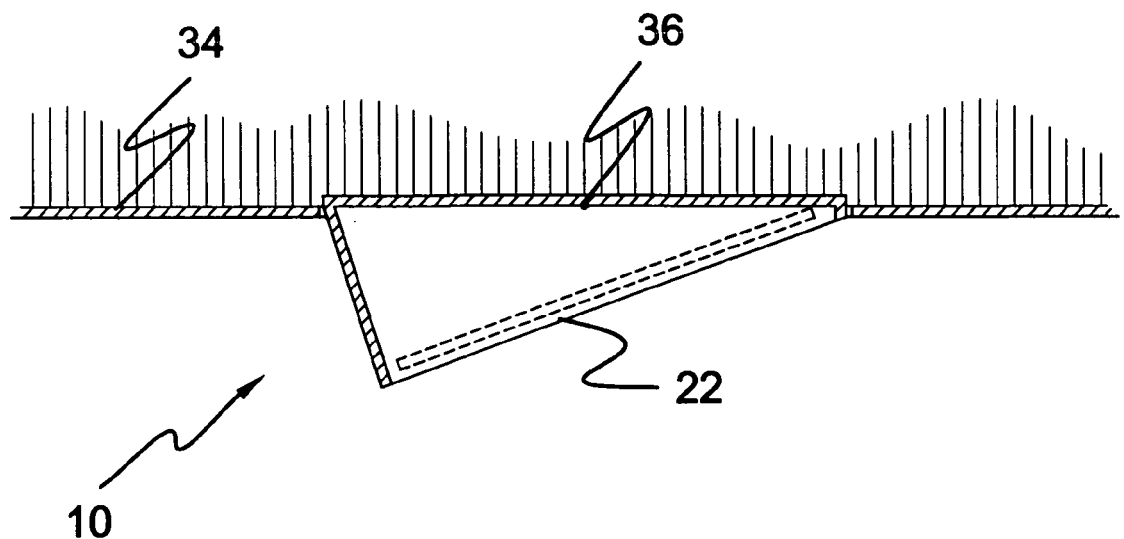
FIG. 10 is a cross sectional view of the present invention in use.

Turning to FIG. 10, shown therein is a cross sectional view of the present invention 10 in use. Depicted above is a sectional view with the mirror housing 22 in an open position. The adjustable mirror is fixedly attached to the automobile quarter panel 34 by permanent means. The mirror housing 22 is pivotable at 36 in the horizontal plane on one end to maintain the aerodynamics of the automobile and to protect the adjustable mirror while not in use.

Figure 11:
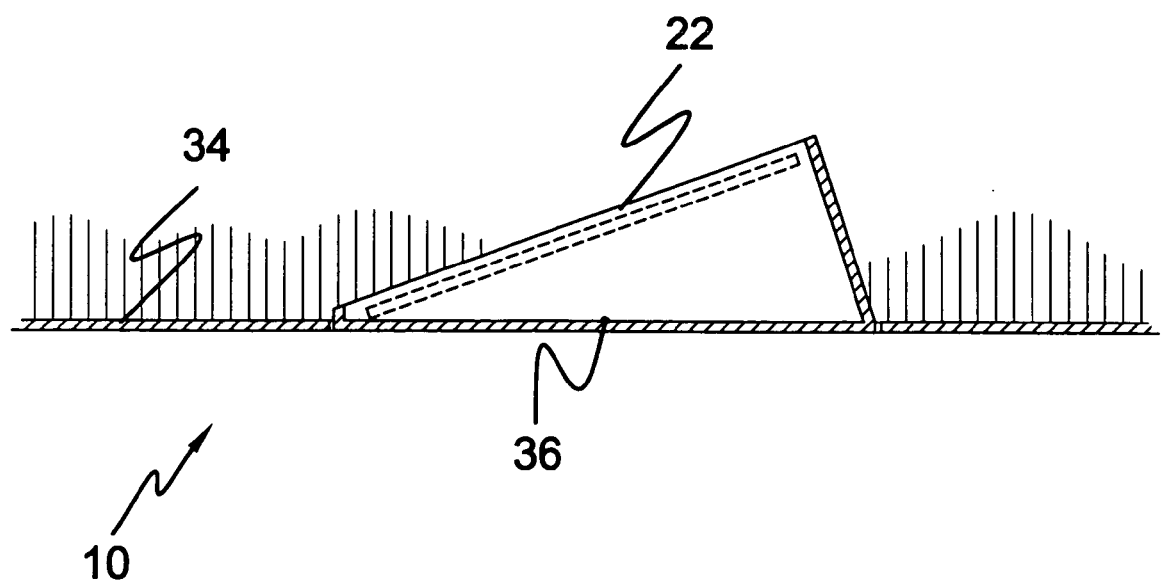
FIG. 11 is a cross sectional view of the present invention in a closed and secure position.

Turning to FIG. 11, shown therein is a cross-sectional view of the present invention 10 in a closed and secure position. Depicted is a sectional view with the mirror housing 22 in a closed position. The adjustable mirror is fixedly attached to the automobile quarter panel 34 by permanent means and is pivotal at 36 on the center axis of the mirror housing 22. When not in use, the mirror housing 22 is rotated 180° in the horizontal plane concealing and protecting the mirror. In this position, the housing 22 face opposite the mirror provides a flush surface with the automobile's outer quarter panel 34.

Figure 12:
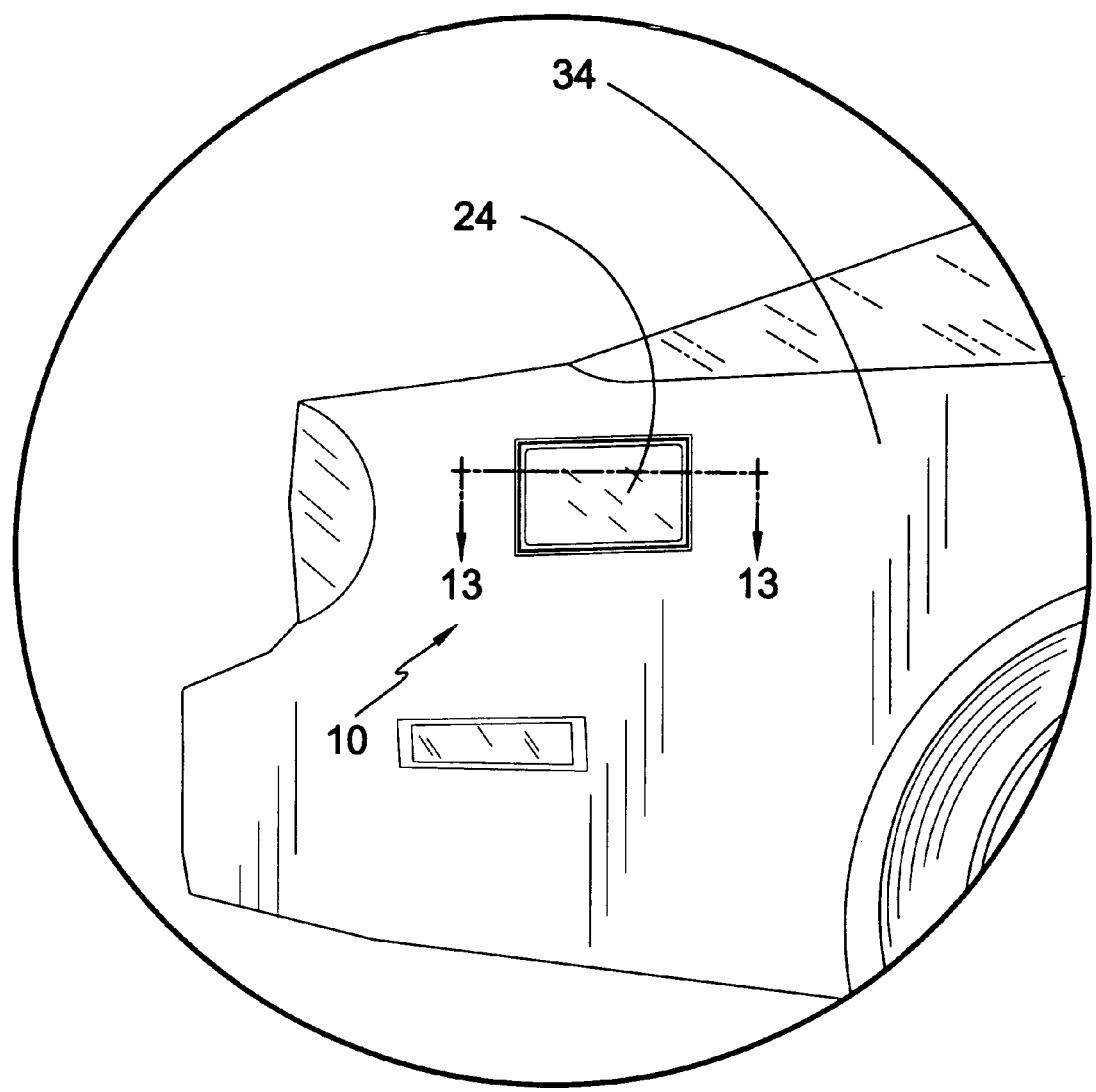
FIG. 12 is a side view of the present invention in a closed and secure position.

Turning to FIG. 12, shown therein is a side view of the present invention 10 in a closed and secure position. Depicted above is an adjustable mirror of the present invention 10 in a closed position. When not in use, the mirror housing is pivotal on one side and rotated inward to allow the angled mirror 24 face to be flush with automobile's outer panel 34.

Figure 13:
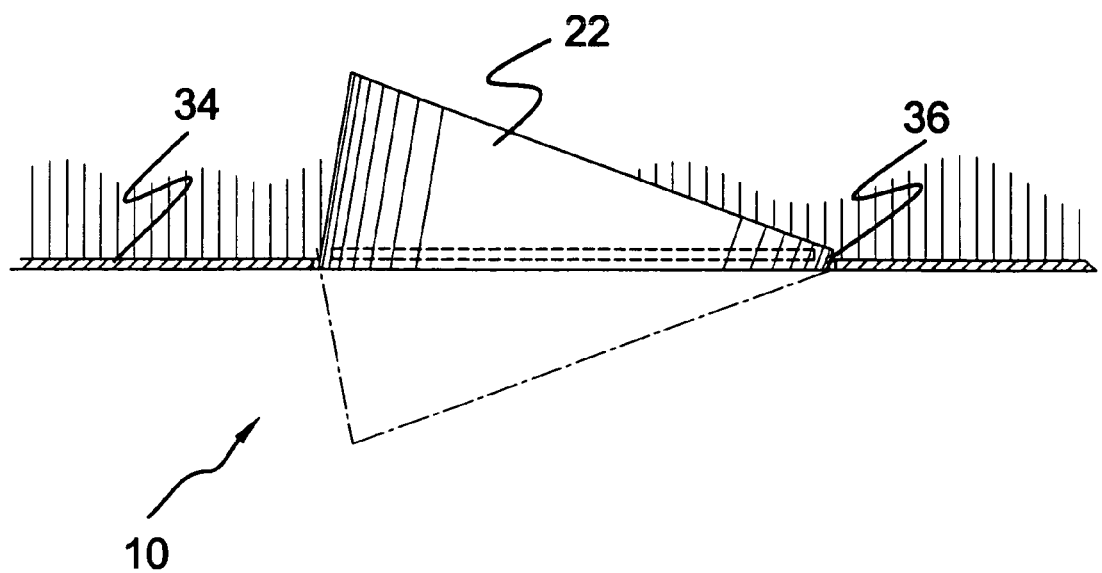
FIG. 13 is a cross sectional view of the present invention in a closed and secure position.

Turning to FIG. 13, shown therein is a cross-sectional view of the present invention 10 in a closed and secure position. Depicted is a sectional view from FIG. 12 with the mirror housing 22 in a closed position. The adjustable mirror housing 22 is shown in a closed position. The mirror housing 22 is pivotal at 36 on one side to provide means to maintain the aerodynamics of the automobile quarter panel 34 and to protect the adjustable mirror while not in use.

Figure 14:
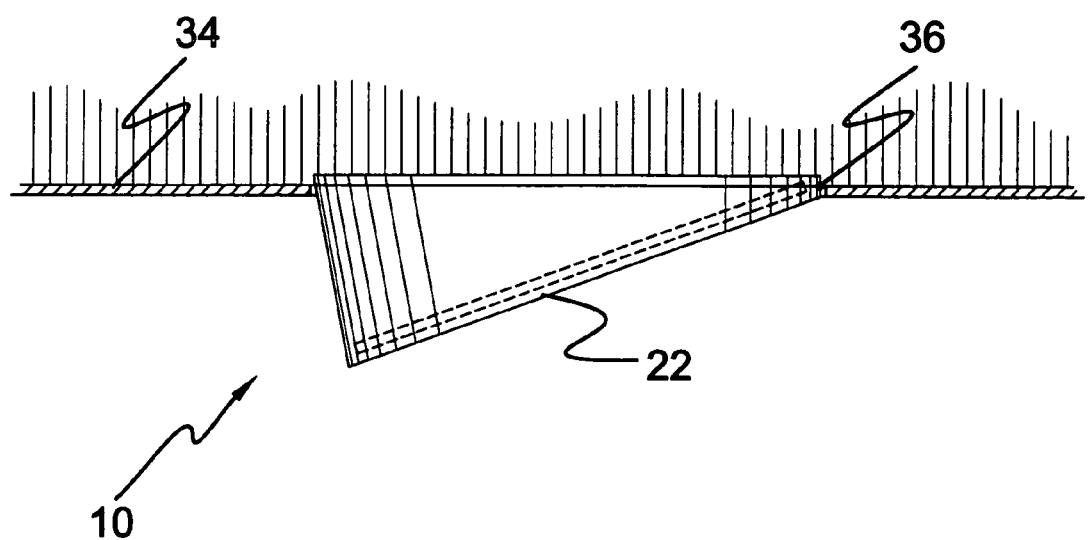
FIG. 14 is a cross sectional view of the present invention in use.

Turning to FIG. 14, shown therein is a cross sectional view of the present invention 10 in use. Depicted above is a sectional view with the mirror housing 22 in an open position. The adjustable mirror is fixedly attached to the automobile panel 34 by permanent means. The mirror housing 22 is pivotable at 36 in the horizontal plane on one end to maintain the aerodynamics of the automobile and to protect the adjustable mirror while not in use.

Figure 15:
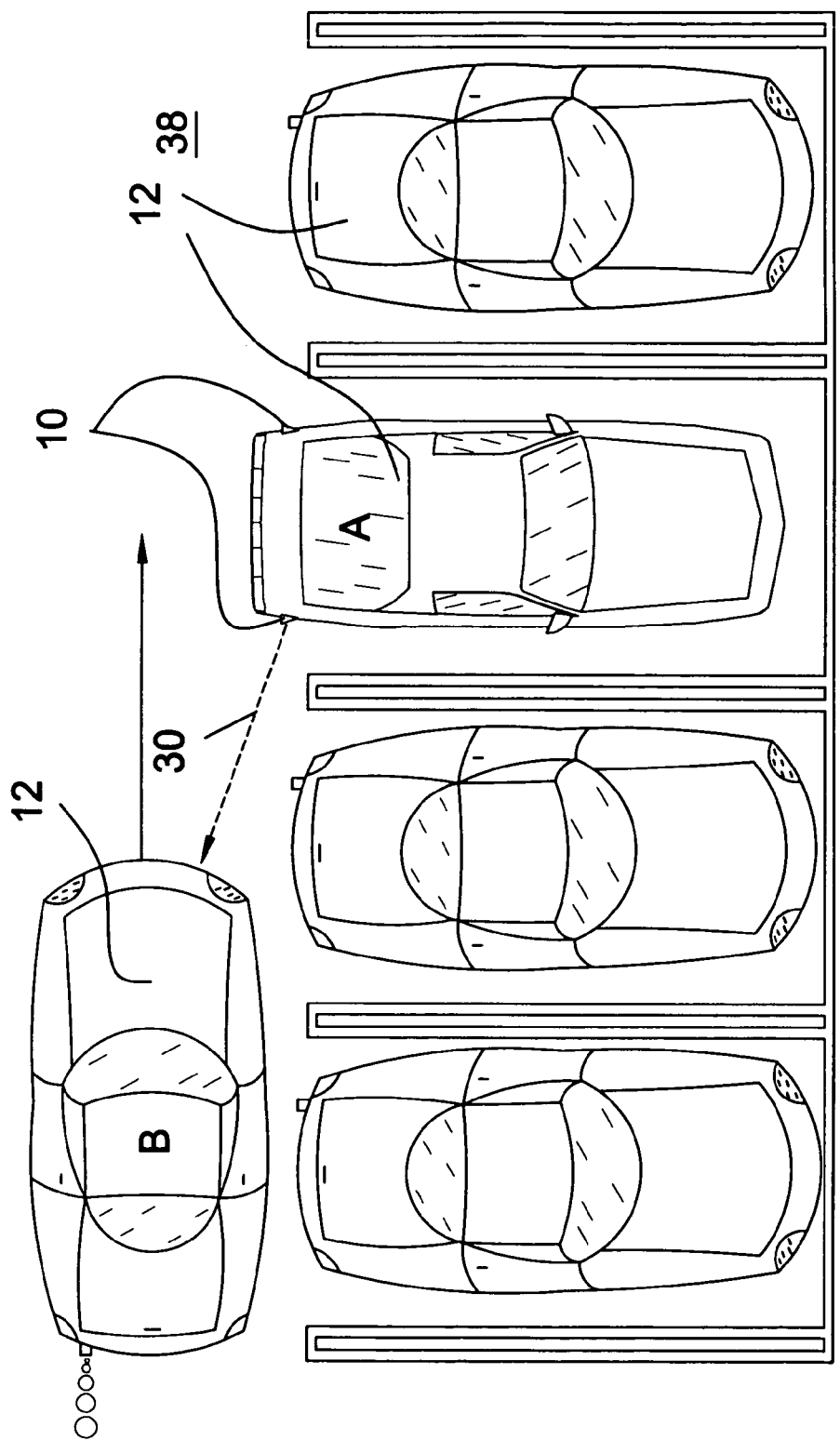
FIG. 15 is a top view of the present invention in use in a parking lot.

Turning to FIG. 15, shown therein is a top view of the present invention in use in a parking lot 38. Shown is a typical parking lot 38 comprised of multiple motor vehicles. Vehicle A has the present invention 10 installed thereon. The viewing angle 30 achieved by positioning the adjustable or fixed mirror of present invention 10 will allow images lateral to what is already viewable through the front side mirrors of the motor vehicle 12 to be viewed also such as approaching vehicle B as depicted.

I claim:

1. An apparatus for providing a lateral view mirror mounted on the rear quarter panels of a vehicle, the vehicle having first and second conventional side mirrors, comprising:
   a) a first and second rear mirror;
   b) a housing for each said first and second rear mirror mounted on each rear quarter panel of the vehicle, said housing having first and second ends, top and bottom edges, and a front and rear side, wherein each said rear mirror is fixed on said front side of each said housing and not movable with respect to said housing, each said housing having a longitudinal axis extending from said first to second ends;
   c) wherein each said housing is tapered outwardly from said first to second ends so that said first end is oriented toward a front of the vehicle and said second end is oriented toward a rear of the vehicle, wherein said first end of said front side is closer to the vehicle and said second end of said front side is farther away from the vehicle when the housing is in a deployed position for use;
   d) wherein when said first and second rear mirrors are viewed through the corresponding first and second conventional side mirrors of the vehicle an increased lateral view area is provided on each side of the vehicle; and
   e) each said first and second housing being pivotal in a horizontal plane about a pivot located on said first end of each said housing so that said second end of each said housing can be pivoted inwardly so that each mirror is substantially flush with the surface of the corresponding rear quarter panel of the vehicle in a retracted position, and said housing is movable between the deployed position wherein the increased lateral viewing area is provided and the retracted position wherein said mirror in each housing is substantially flush with an outer surface of a rear quarter panel.

2. The apparatus of claim 1, wherein each said first and second mirror housing is adjustable between the deployed position and the retracted position within the rear quarter panel so that said increased lateral viewing area is adjustable between the deployed and retracted positions.

* * * * *